July 11, 1950
G. G. HANSON ET AL
2,514,760
GRIPPING TOOL
Filed Sept. 2, 1948
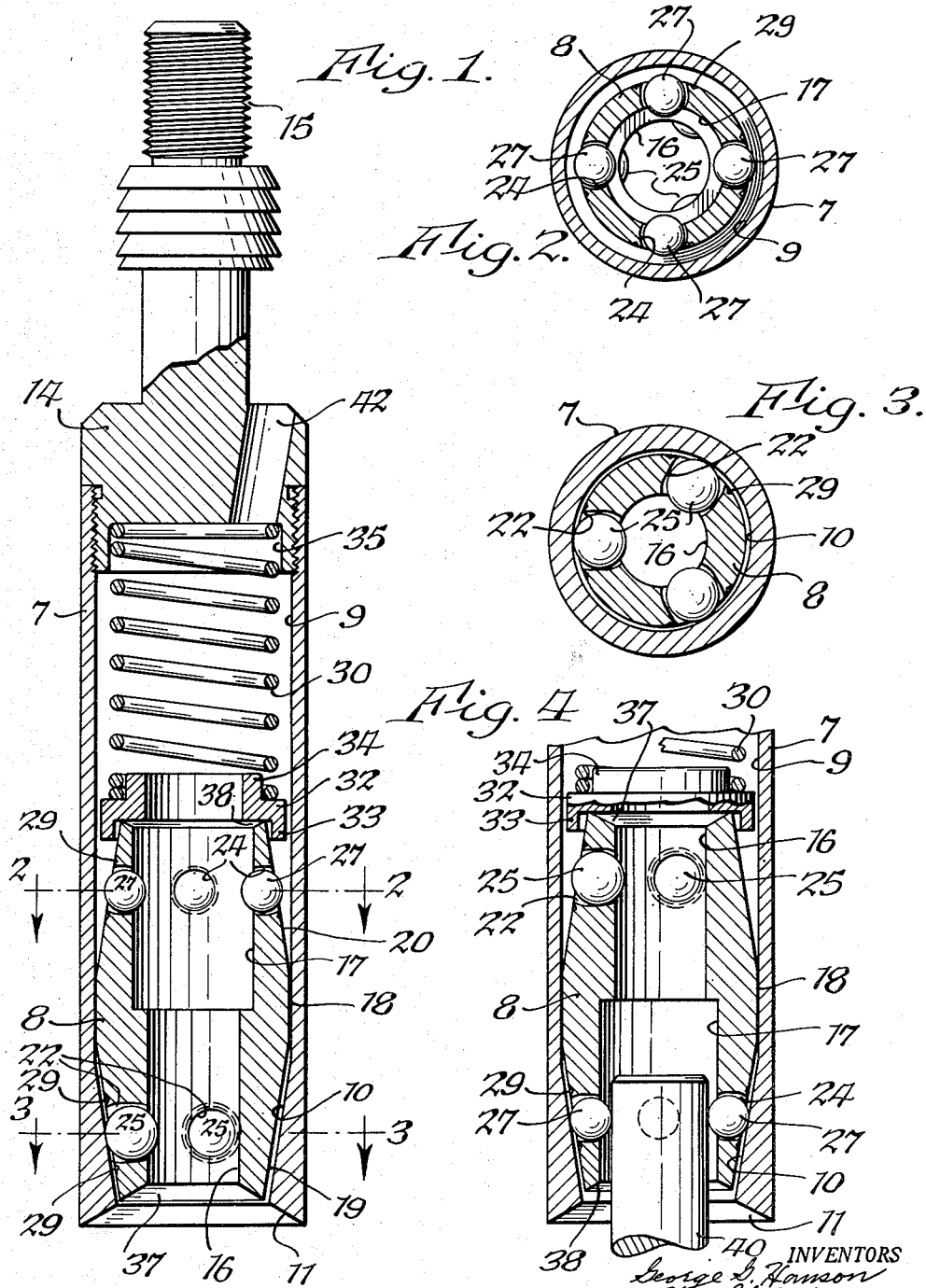
INVENTORS
George G. Hanson
Harold R. Hanson
BY
Parker, Prochnow & Farmer
Attorneys.

Patented July 11, 1950

2,514,760

UNITED STATES PATENT OFFICE 2,514,760

GRIPPING TOOL

George G. Hanson and Harold R. Hanson, Bradford, Pa.

Application September 2, 1948, Serial No. 47,466

4 Claims. (Cl. 294—102)

This invention relates to improvements in tools or implements for gripping rods, tubes or the like to hold the same against lengthwise movement in one direction relatively to the tool or implement. Devices of this kind may, for example, be used as fishing tools for removing sucker rods, drill rods or the like from wells.

One of the objects of this invention is to provide a gripping tool or implement of this type of improved and simplified construction which is reliable in its action and efficient in operation.

Another object of this invention is to provide a gripping tool of this type of improved construction which may be used in connection with rods or tubes of a number of different diameters.

A further object is to provide a gripping tool of this type including a ball carrier on which balls are arranged in such a manner as to be kept in operative relation to the ball carrier when the same is removed from the shell or body portion of the tool.

Other objects and advantages of this invention will appear from the following description and claims.

In the accompanying drawings:

Fig. 1 is a central sectional elevation of a gripping tool embodying this invention.

Figs. 2 and 3 are transverse sectional elevations thereof, respectively on lines 2—2 and 3—3, Fig. 1.

Fig. 4 is a fragmentary, central, sectional elevation similar to that shown in Fig. 1, but in which the ball carrier has been reversed for cooperation with rods of different diameter.

Our improved gripping tool, one embodiment of which is illustrated in the accompanying drawings, includes an outer, hollow, cylindrical shell or tubular body portion or member 7 within which a ball carrier 8 is arranged to slide vertically therein. This shell or body member has the inner bore thereof formed with a substantially cylindrical inner surface 9 which terminates at its lower end in an inner surface 10 of frusto conical or tapering form converging toward the lower end of the body member. The lower end of the frusto conical bore of the body member terminates in an outwardly flaring or bell-shaped lower end 11 formed so that it will, upon engaging an end of a rod, guide this end of the rod toward the vertical axis of the body member, so that such rod will enter the body portion.

The upper end of the body portion is removably secured to a connector or head 14 in any suitable manner, for example, the upper end of the body member may be internally screw-threaded to cooperate with a corresponding external screw thread formed on the lower part of the connector or head 14, the upper end of which is threaded as shown at 15, for coupling with a correspondingly threaded part of a suitable handle or handling tube or rod (not shown), by means of which the tool may be manipulated. For example, the tool when used as a fishing tool may be lowered into and raised out of a well casing by means of the handling tube or rod. The connector or head 14 may be of any suitable or desired construction adapting it to be securely attached to the upper end of the tubular body member 7.

The ball carrier 8 is also of tubular form having an interior bore formed to receive the rods, tubes or the like which are to be gripped, and in the preferred construction of this carrier, it has an inner bore 16 of a diameter capable of operating on rods or tubes of one size, and another inner bore 17 which, in the construction illustrated, is of greater diameter than the bore 16 and is capable of operating on rods or tubes of larger diameter. Each bore is approximately of half the length of the ball carrier. On the exterior, the ball carrier is formed intermediate of its ends with a substantially cylindrical portion 18 capable of cooperating with the cylindrical bore 9 of the tubular body portion in such a way that the ball carrier may slide within the body member. The cylindrical portion 18 terminates at its opposite ends in two tapering or frusto-conical outer portions 19 and 20, the taper of which corresponds approximately to the internal taper 10 of the body portion 7. Consequently, the ends of the ball carrier are of smaller diameter than the middle cylindrical portion.

In order to enable the tool to grip a rod or tube, the walls of the tapering portions of the ball carrier are provided with a plurality of radially extending holes or cylindrical ball-receiving apertures 22 and 24, the apertures 22 being formed to loosely receive balls 25 and the apertures 24 being formed to cooperate with balls 27. The holes 22 are arranged in an annular zone in the tapering portion 19 of the ball carrier, and the holes 24 are arranged in an annular zone in the tapering portion 20 of the ball carrier. The balls 25 and 27 are of such diameters that the balls will extend beyond the opposite ends of the holes in which they are located. Consequently, since the thickness of the wall of the ball carrier is greater at the portion 19 thereof which has the smaller diameter bore 16, the balls 25 are of larger diameter than the balls 27. The balls are capable of movement to a limited extent lengthwise of the apertures 22 and 24, so that in any position of these balls in their apertures they may project into the bores 16 and 17 and also beyond the tapering surfaces 19 and 20. The ends of the apertures 22 and 24 are restricted for the purpose of limiting the extent to which the balls may move lengthwise of these apertures. These restrictions may be formed in any suitable or desired manner. For example, in the construction illustrated, the apertures 22 and 24 are formed by drilling radially through the wall of the ball carrier and stopping the drilling before the drill has passed completely through the aperture, so that the inner portion of each aperture will be of slightly less diameter than the diameter of the ball which fits into the same. After the ball has been inserted into the aperture, the outer end of the aperture may be reduced in any suitable manner to prevent the ball from passing outwardly completely through the outer end of the aperture. This may, for example, be done by forcing the metal of the ball carrier inwardly toward the aperture for restricting the same. For example, this may be done by deforming the metal of the ball carrier at intervals about the aperture by means of a prick punch or other sharp implement to form indentations 29 in the ball carrier in close proximity to the aperture so that the metal at the outer end of the aperture will be forced toward the axis of the aperture by this punching operation, to a sufficient extent to prevent the ball from passing completely out of the aperture.

The ball carrier is yieldingly pressed toward the lower end of the tubular body member 7 in any suitable manner, for example, by means of a coil spring 30, one end of which may bear against the upper end of the ball carrier through the medium of a cap or collar 32 having a downwardly extending flange 33 which fits over the adjacent end of the ball carrier. The collar may also be provided with a flange 34 of smaller diameter which fits into the end of the coil spring 30. The upper end of the coil spring may extend into the recess 35 in the connector or head 14. In this manner the spring is centered with reference to the body portion.

As will be noted in Figs. 1 and 4, the outer periphery of the collar 32 extends into close proximity to the inner cylindrical bore 9 of the tubular body member 7. Consequently, the collar cooperates with the ball carrier in such a manner as to hold the ball carrier loosely in approximately coaxial relation with the body portion and prevents tilting of the ball carrier within the body portion to such an extent as to cause jamming or wedging of the ball carrier in the body portion. The collar, however, fits loosely enough on the ball carrier and within the body member 7 so that the ball carrier may tilt to a slight extent to enable it to better grasp the rod to be gripped. The collar, therefore, serves the twofold purpose of forming a connection between the spring and the ball carrier and of holding the ball carrier in approximately coaxial relation with the tubular body portion. The collar is formed to fit either end of the ball carrier, so that the latter may be reversed if desired, as shown in Fig. 4.

The opposite ends of the ball carrier are also preferably provided with inwardly converging, frusto-conical or bell-shaped faces 37 and 38 so as to facilitate the insertion of a rod into the gripping tool. This construction is particularly desirable when the gripping tool is used as a fishing device, in that the rod which is being fished for will be guided into the bores 16 and 17 respectively of the ball carrier.

In the use of the device, if a rod is to be gripped which will fit into the bore 16 of the carrier, then the carrier is arranged in the body member 7 as shown in Fig. 1, with the bore 16 at the lower end of the ball carrier. A rod or tube may then readily be inserted into the bore 16, and when the same has passed beyond the balls 25, these balls will grip the rod or tube and prevent withdrawal of the same. The rod or tube may, of course, be released from the gripping device by releasing the pull on the same and moving the ball carrier inwardly against the action of the spring 30 by a screwdriver or other implement, whereupon the rod or tube may readily be withdrawn from the gripping tool. When the device is used for fishing a rod from a well and is lowered into a well to engage the end of the rod which is being fished for, this rod will be guided by the frusto-conical or bell-shaped faces 11 and 37 into the bore 16, and upon engaging the lower balls 25, will force the ball carrier upwardly into the body member until the rod which is being fished for passes between the balls 25. Upon upward movement of the gripping tool, the balls 25 engaging the rod will tend to roll downwardly into the tapering bore 10 of the body portion by the action of the spring 30 and by frictional engagement with the rod, and will thus be forced by a wedge action into gripping engagement with the rod, so that upon raising the gripping tool, the rod will be carried upwardly with the same.

If the gripping tool is to be used with a rod 40 of larger diameter which cannot enter the bore 16, but which can enter the bore 17, then the tubular body member 7 is unscrewed from the connector or head 14, whereupon the spring, the follower 32 and the ball carrier 8 are removed from the body member and the ball carrier is reversed end for end, so that the bore 17 thereof is lowermost. The follower and spring are replaced and the body portion is again secured to the connector or head 14. The parts will then be in the position illustrated in Fig. 4, whereupon the same procedure may be followed for gripping the end of the rod 40.

Because of the fact that the metal wall of the ball carrier between the bore 17 and the outer surface thereof is less thick than between the bore 16 and the outer surface, the balls 27 are of smaller diameter than the balls 25. If deemed necessary, a larger number of small balls 25 may be provided, four being shown in the construction illustrated and three of the larger balls 27. It will be obvious, however, that any desired number of balls may be provided at either end of the ball carrier.

Since the rod which is being fished for may be located below the level of the liquid in the well casing, one or more apertures 42 are preferably provided in the connector or head 14 through which liquid within the tubular body portion 7 may pass during the lowering of the fishing tool into the well casing, and during the entry of the end of the rod which is being fished for into a bore of the ball carrier.

The device described has the advantage that it may be readily adapted for use in gripping rods of various sizes. When it becomes necessary to invert the ball carrier to enable the same to cooperate with a rod, this can easily be done, as described, by inverting the ball carrier in the body portion and when the ball carrier is removed from the body portion, the balls will be retained in their holes or apertures in the ball carrier by the restrictions in the openings of these holes so that loss of the balls is avoided. If a ball becomes broken or otherwise damaged, it can be readily removed by again enlarging the outer end of the hole in which the broken or damaged ball is located and a new ball may be inserted, whereupon the outer end of the aperture may again be contracted by means of a prick punch or other implement.

The term "rod" is herein used to indicate any article, such as a rod, tube, stud or the like which is to be equipped by means of the gripping tool herein described.

It will be understood that various changes in the details, materials, and arrangements of parts which have been described and illustrated in order to explain the nature of the invention, may be made by those skilled in the art within the principle and scope of the invention as expressed in the appended claims.

We claim as our invention:

1. A rod gripping tool comprising a hollow cylindrical body member having an inner cylindrical bore terminating at its lower end in a tapering downwardly converging bore, a ball carrier arranged in said body member and having an axially extending bore, a part of said bore extending from approximately the middle of said ball carrier to one end thereof being of larger diameter than the part of said bore terminating at the other end thereof, the upper and lower portions of said ball carrier having external surfaces tapering toward the opposite ends thereof to enable either end of said ball carrier to enter said tapering bore of said body member, said ball carrier having an annular series of radially extending holes in each of said parts, balls arranged in said holes and of such diameter as to simultaneously extend beyond both ends of said holes, means confining said balls against movement entirely out of said holes, said ball carrier being reversible so that either end thereof may be arranged at the lower portion of said body member, and yielding means for urging said ball carrier partly into the lower portion of said body member.

2. A rod gripping tool comprising a hollow cylindrical body member having an inner cylindrical bore terminating at its lower end in a tapering downwardly converging bore, a ball carrier arranged in said body member and having an axially extending bore, a part of said bore extending from approximately the middle of said ball carrier to one end thereof being of larger diameter than the part of said bore terminating at the other end thereof, said ball carrier having an intermediate portion of substantially cylindrical periphery and having frusto-conical end portions with surfaces converging from said cylindrical periphery toward the opposite ends of said ball carrier, said frusto-conical end portions corresponding approximately to the tapering bore in said body member so that either end of said ball carrier may enter said tapering bore of said body member, an annular series of radially extending apertures in each end portion of said ball carrier, balls in said holes and movable radially therein, said balls being of sufficient size so that portions thereof extend outwardly beyond the opposite ends of said holes, restrictions at the ends of said holes to prevent said balls from passing entirely out of said holes when said ball carrier is removed from said body member, and means for yieldingly urging said ball carrier toward the bottom of said body member.

3. A gripping tool comprising a hollow cylindrical body member having an inner cylindrical bore terminating at its lower end in a tapering downwardly converging bore, a ball carrier arranged in said body member and having an axially extending bore, a part of said bore extending from approximately the middle of said ball carrier to one end thereof being of larger diameter than the part of said bore terminating at the other end thereof, the upper and lower portions of said ball carrier having external surfaces tapering toward the opposite ends thereof to enable either end of said ball carrier to enter said tapering bore of said body member, said ball carrier having an annular series of radially extending holes in each of said parts, balls arranged in said holes and of such diameter as to simultaneously extend beyond both ends of said holes, means confining said balls against movement entirely out of said holes, said ball carrier being reversible so that either end thereof may be arranged at the lower portion of said body member, a collar having a flange fitting about the upper end of said ball carrier, and a spring pressing against said collar for urging said ball carrier toward the lower end of said body member.

4. A gripping tool according to claim 3, in which said collar is of an outer diameter fitting loosely into said cylindrical portion of said body member, and in which said flange extends around the upper part of the ball carrier, said collar cooperating with said ball carrier to hold said ball carrier in approximately axial relation to said body member and preventing binding of said ball carrier in the bore of said body member.

GEORGE G. HANSON.
HAROLD R. HANSON.

REFERENCES CITED

The following references are of record in the file of this patent:

UNITED STATES PATENTS

| Number | Name | Date |
|---|---|---|
| 1,031,637 | Fischer | July 2, 1912 |
| 1,829,760 | Santiago | Nov. 3, 1931 |

Certificate of Correction

Patent No. 2,514,760                                             July 11, 1950

GEORGE G. HANSON ET AL.

It is hereby certified that error appears in the printed specification of the above numbered patent requiring correction as follows:

Column 4, line 53, for "balls 25" read *balls 27*; line 55, for "balls 27" read *balls 25*; and that the said Letters Patent should be read as corrected above, so that the same may conform to the record of the case in the Patent Office.

Signed and sealed this 10th day of October, A. D. 1950.

[SEAL]

THOMAS F. MURPHY,
*Assistant Commissioner of Patents.*